US009891909B2

(12) United States Patent
Konrad et al.

(10) Patent No.: US 9,891,909 B2
(45) Date of Patent: Feb. 13, 2018

(54) DYNAMIC RECONNECT OF WORK PROCESSES IN A ZERO DOWNTIME MAINTENANCE PROCEDURE

(71) Applicant: SAP SE, Walldorf (DE)

(72) Inventors: Heiko Konrad, Hockenheim (DE); Edgar Lott, Nussloch (DE); Andrea Neufeld, Limbergerhof (DE)

(73) Assignee: SAP SE, Walldorf (DE)

(*) Notice: Subject to any disclaimer, the term of this patent is extended or adjusted under 35 U.S.C. 154(b) by 94 days.

(21) Appl. No.: 14/981,137

(22) Filed: Dec. 28, 2015

(65) Prior Publication Data

US 2017/0185392 A1    Jun. 29, 2017

(51) Int. Cl.
*G06F 9/44*    (2006.01)
*G06F 9/445*    (2006.01)
*G06F 17/30*    (2006.01)

(52) U.S. Cl.
CPC .......... *G06F 8/67* (2013.01); *G06F 8/70* (2013.01); *G06F 8/73* (2013.01); *G06F 17/30377* (2013.01); *G06F 17/30578* (2013.01); *G06F 8/72* (2013.01); *G06F 8/75* (2013.01)

(58) Field of Classification Search
CPC .. G06F 17/30289–17/30699; G06F 8/20–8/78
See application file for complete search history.

(56) References Cited

U.S. PATENT DOCUMENTS

| 7,512,631 B2 * | 3/2009 | Medicke | G06F 17/30312 |
| 7,720,884 B1 * | 5/2010 | Gandhi | G06F 17/30306 |
| | | | 707/804 |
| 9,507,810 B2 * | 11/2016 | Baeuerle | G06F 17/30297 |
| 9,547,672 B2 * | 1/2017 | Mansur | G06F 17/303 |
| 2007/0226171 A1 * | 9/2007 | Medicke | G06F 17/30312 |
| 2008/0147704 A1 * | 6/2008 | Godwin | G06F 17/30312 |
| 2013/0238555 A1 | 9/2013 | Driesen et al. | |
| 2013/0238868 A1 | 9/2013 | Driesen et al. | |
| 2014/0089253 A1 * | 3/2014 | Mansur | G06F 17/303 |
| | | | 707/609 |

(Continued)

OTHER PUBLICATIONS

Lee, Jay, "A Framework for Web-Enabled E-Maintenance Systems," 1996, pp. 450-459.*

(Continued)

*Primary Examiner* — Christopher Franco
(74) *Attorney, Agent, or Firm* — Fish & Richardson P.C.

(57) ABSTRACT

The disclosure generally describes methods, software, and systems, including a method for updating an application. At least one application instance of an application is managed. Each application instance is associated with a plurality of executing work processes connected with a first database schema. A bridge database schema is generated that is related to the first database schema. The bridge database schema represents a copy of the first database schema and is generated in response to initiation of an update to the application. In response to determining that the generation of the bridge database schema is complete, for each of the plurality of work processes, a commit work action performed by the particular work process is determined. In response to determining performance of the commit work action, the particular work process is connected to the bridge database schema.

20 Claims, 5 Drawing Sheets

(56) References Cited

U.S. PATENT DOCUMENTS

| | | | | |
|---|---|---|---|---|
| 2015/0106140 A1* | 4/2015 | Biewald | ............ | G06Q 10/0631 705/7.12 |
| 2015/0161182 A1* | 6/2015 | Baeuerle | ........... | G06F 17/30297 707/803 |
| 2016/0098438 A1* | 4/2016 | Eberlein | ........... | G06F 17/30362 707/704 |

OTHER PUBLICATIONS

Li, Yan et al., "An Agent-based Platform for Web-enabled Equipment Predictive Maintenance," 2005, pp. 1-4.*

Bezemer, Cor-Paul et al., "Multi-Tenant SaaS Applications: Maintenance Dream or Nightmare?" 2010, pp. 88-92.*

Labib, Ashraf W., "Next Generation Maintenance Systems: Towards the Design of a Self-maintenance Machine," 2006, 213-217.*

Lowell, David E. et al., "Devirtualizable Virtual Machines Enabling General, Single-Node, Online Maintenance," 2004, pp. 211-223.*

Susto, Gian Antonio et al., "A Predictive Maintenance System for Integral Type Faults based on Support Vector Machines: an Application to Ion Implantation," 2013, pp. 195-200.*

U.S. Appl. No. 14/495,056, Andrey Engelko et al.

Bartels, Christian; SAP on IBM i—Development Update, © 2014 International Business Machines Corporation; 22 pages; https://www-950.ibm.com/events/wwe/grp/grp017.nsf/vLookupPDFs/SAP%20on%20IBM%20i%20Development%20Update_Christian%20Bartels/$file/SAP%20on%20IBM%20i%20Development%20Update_Christian%20Bartels.pdf [Retrieved Dec. 22, 2015].

* cited by examiner

| LEVEL 302 | DOWNTIME 304 | RE-LOGON 306 | DESCRIPTION 308 | VISUALIZATION 310 |
|---|---|---|---|---|
| A 302a | 0 | NO | CONTINUOUS OPERABILITY WITHOUT RE-LOGON BUT WITH RE-LOAD | |
| B 302b | 0 | YES, ASYN | CONTINUOUS OPERABILITY WITH ASYNCHRONOUS RE-LOGON | |
| C 302c | 0 | YES, SYNCHR | CONTINUOUS OPERABLITY WITH SIMULTANEOUS RE-LOGON (ALL USERS LOGGED OFF AT ONE POINT IN TIME). (POSSIBLY LIMITED FUNCTIONALITY BEFORE SWITCH OVER) | |
| D 302d | X min | YES | SYSTEM RESTART LESS THAN (HALF) AN HOUR DOWNTIME | |
| E 302e | > 1h | YES | FEW HOURS...TO...SEVERAL HOURS DOWNTIME | MAINTENANCE MODE 312  DOWNTIME 314 |

AVAILABILITY CATEGORY DEFINITION 300

FIG. 3

DYNAMIC RECONNECT OF WORK PROCESSES IN A ZERO DOWNTIME MAINTENANCE PROCEDURE

BACKGROUND

The present disclosure relates to procedures used to install new versions of systems (e.g., applications).

When a new version of a system is installed, traditional procedures may require that a user to logout and then log back in, e.g., for the duration of an install. During this time, users typically cannot continue working and using the system. For example, in procedures that use a rolling reconnect, application servers from an original database (DB) schema can be re-connected to a target schema. In this approach, one application server after another is stopped and then restarted with the target DB schema in a reconnection. Stopping an application server means that users who are logged into the application server will need to re-login. Another problem with the rolling re-connect is the duration of the complete operation. For example, the duration is increased for sessions not terminated that have data not yet committed to the database, as this would lead to data loss. Thus, the shutdown of one instance can take as long as the longest-running user transaction. For example, for a set of n application server instances, a complete roll-over can take at least n times the longest running user transaction. If work processes are distributed to the application server instances, this can delay the restart even more, e.g., to the sum of time for the longest-running work process per instance.

SUMMARY

The disclosure generally describes computer-implemented methods, software, and systems for updating an application. At least one application instance of an application is managed, such as by a group of application servers. Each application instance is associated with a plurality of executing work processes connected with a first database schema. A bridge database schema is generated that is related to the first database schema. The bridge database schema represents a copy of the first database schema and is generated in response to initiation of an update to the application. Within the bridge schema, a view is created for every table in the original schema. Then the application servers are configured to connect no longer to the original schema, but to the bridge schema. In response to determining that the generation of the bridge database schema is complete, for each of the plurality of work processes, a commit work action performed by the particular work process is determined. In response to determining performance of the commit work action, the particular work process is connected to the bridge database schema.

One computer-implemented method includes: managing at least one application instance of an application, each application instance associated with a plurality of executing work processes connected with a first database schema; generating a bridge database schema related to the first database schema, the bridge database schema representing a copy of the first database schema, the bridge database schema generated in response to initiation of an update to the application; and in response to determining that the generation of the bridge database schema is complete, for each of the plurality of work processes: determining a commit work action performed by the particular work process; and in response to determining performance of the commit work action, connecting the particular work process to the bridge database schema.

The foregoing and other implementations can each optionally include one or more of the following features, alone or in combination. In particular, one implementation can include all the following features:

In a first aspect, combinable with any of the previous aspects, work processes still connected after a particular amount of time are forced to time out and reconnect to the bridge database schema.

In a second aspect, combinable with any of the previous aspects, work processes associated with the application instance are connected to the bridge database schema during the update.

In a third aspect, combinable with any of the previous aspects, the method further includes determining that the update has completed and, in response to determining that the update has completed, reconnecting the work processes of the application instance to an updated database schema.

In a fourth aspect, combinable with any of the previous aspects, the method further includes using state variables and function calls to perform the update.

In a fifth aspect, combinable with any of the previous aspects, the state variables and function calls are associated with and applied to application instances and to work processes controlled by an application server controlling a given application instance.

In a sixth aspect, combinable with any of the previous aspects, the update is performed using instructions provided to a task handler of a primary application server instance, which then communicates with task handlers of one or more other application server instances.

The subject matter described in this specification can be implemented in particular implementations so as to realize one or more of the following advantages. Users do not need to re-login during the transition to the bridge in a zero downtime maintenance (ZDM) update. The transition procedure is smoother and runs faster, with less user disruption.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 is a table illustrating different availability levels that apply to different types of system updates.

Like reference numbers and designations in the various drawings indicate like elements.

DETAILED DESCRIPTION

Figure 1:
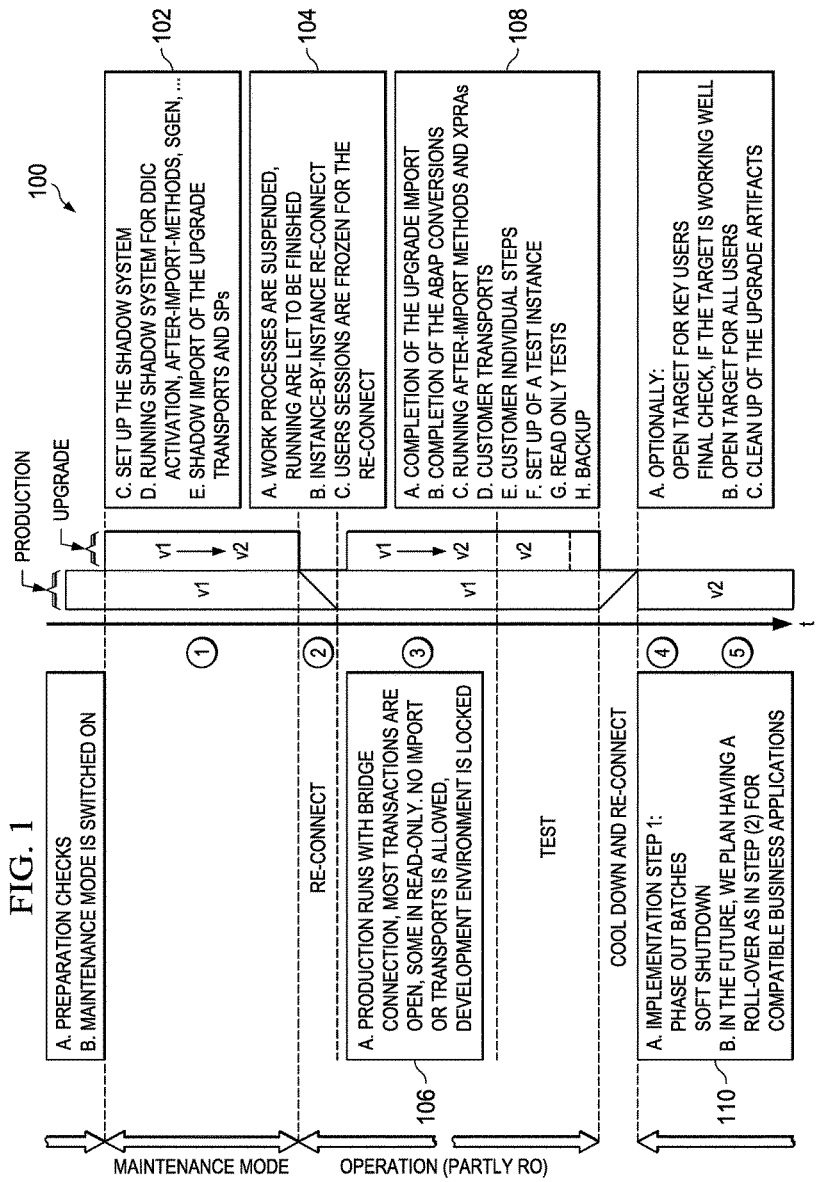
FIG. 1 is a block diagram of a zero downtime procedure for installing a system upgrade and/or update.

This disclosure generally describes computer-implemented methods, software, and systems for updating an application using a zero downtime maintenance (ZDM) procedure. At least one application instance of an application that uses a first version of the application is managed. Each application instance is associated with a plurality of executing work processes connected with a first database schema, where the first database schema is associated with the first version of the application. A bridge database schema is generated that is related to the first database schema, where the bridge database schema can be used to allow application instances to continue working with the first version of the application while the first version of the application and the first database schema are being updated. In some instances, the bridge database schema represents a copy of the first database schema and is generated in response to initiation of an update to the application to a second version. In response to determining that the generation of the bridge database schema is complete, for each of the plurality of work processes, a commit work action (performed by each of the individual work processes) is determined. In response to determining performance of the commit work action, the particular work process is connected to the bridge database schema. Subsequent operations can allow the upgrade work processes to begin using the second version of the application.

As a result of using the ZDM procedure, for example, instead of entire application instances being stopped to move to a bridge database schema during the update, the process is done on a work process by work process basis as each work process performs a commit work action, thereby removing the need to prematurely end work processes before they complete their current operation. In this way, after changing the database connection parameters dynamically, the work processes can be seamlessly connected to the bridge database schema, and users should not usually notice any change. After all users have been transferred to the bridge database schema, the original schema can be modified to create a new version, and the update to the new version of the application can continue.

In some implementations, zero downtime maintenance procedures can be provided to update systems (e.g., business application systems) without downtime from one version to another. For example, one goal of the procedure can be to minimize the impact on the business which is operated using the system, as well as the users working with the system. Another goal is to provide regular operation of applications on the bridge system. However, some tables can be set as read-only, e.g., if complicated table adjustments exist for the conversion.

In some implementations, a system can be built using a three-tier client server architecture. For example, the three-tier client architecture can include one database system and a set of application servers. The application servers can be grouped in instances, each instance running several work processes. A typical distribution of the system can include, for example, one DB host that runs the DB system and one or more application server hosts, each host running a business system instance, with each instance having multiple work processes.

In some implementations, application servers can be started and stopped independently. For example, at least one application server must be running at a given time in order to serve user requests. In some implementations, customers can typically scale the number of application servers, e.g., if additional user requests are to be served. Two or more application servers can also be used to provide a fail-safe assuring that, in case one application server fails, users can continue working with the another application server.

FIG. 1 is a block diagram of a zero downtime procedure 100 for installing a system upgrade and/or update. For example, the update can be associated with the release of a new version of an application and/or subsequent update to underlying database schema. The procedure 100 includes detailed steps and usage of the different systems by production and update. In some implementations, a zero downtime maintenance procedure for the business application server can include the following example periods and steps.

In a maintenance mode period 102 associated with system uptime and a shadow system, for example, preparation checks can be run, e.g., to prepare for the maintenance. In some implementations, modes and switches can be used during this and other periods. For example, a maintenance mode can be switched on, e.g., including a parameter along the lines of (LOCK_EU, no changes in development environment, no transports to system, except by update). In some implementations, a shadow system can be set up that is used for running processes that include, e.g., data dictionary (DDIC) activation, system generation (SGEN), and for other purposes. During this period, update transports and support packages (SPs) can be imported to shadow tables.

In a reconnect period 104, for example, production instances can be re-connected to a bridge database schema. In some implementations, a user interface can be provided, for example, in which dialog can be provided (before the reconnect steps are run) that enables an administrator to plan the timing of the reconnect. The initiation of work processes can be suspended, and work processes that are running can be allowed to complete their tasks (e.g., via commit work actions). Typical systems, at this point, would stop instances on an instance-by-instance basis, re-connect to the bridge and re-start, and require users to re-login. However, with the techniques described herein, work processes are simply re-connected to the bridge database schema as those work processes complete their actions. For work processes not currently executing action, the re-connection can be made immediately or without consideration of the timing of the re-connect.

In a bridge operation period 106, for example, production transactions can run on the bridge sub-system in maintenance mode. Business transactions can be open, meaning that there may be some tables that are locked against write and which are to be processed by, e.g., by XPRAs (Execution of Program after Import) reports and conversions. During the bridge operation period 106, importing or transports can be disallowed, and the development environment can be locked.

In an update completion period 108, e.g., parallel to the bridge operation period 106, the update import can be completed, and the business system conversions can be completed. Other tasks included in this period can include, for example, running after-import-methods and XPRAs, performing customer-unique steps, running customer transports, setting up test instances, performing read-only tests, and performing backups.

In a switch-over period 110, e.g., users can be switched from the bridge to target production. A dialog can be provided before the steps to enable an administrator to plan the timing. Work processes can be phased out, and a soft shutdown can occur. After changing the database connection parameters, the production instances can be re-connected to the original schema.

Figure 2:
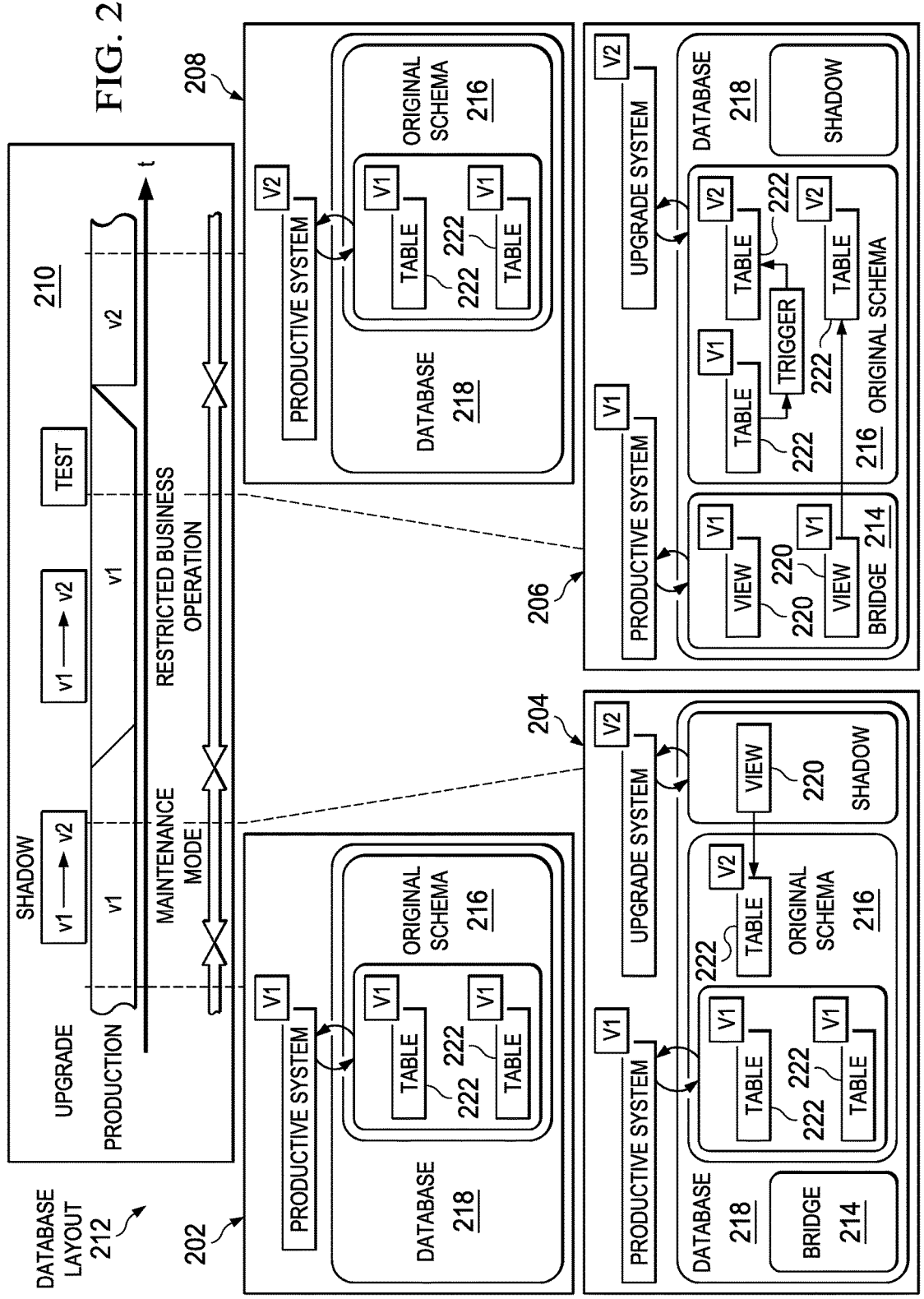
FIG. 2 is a block diagram of example database layouts used during maintenance and production phases associated with a zero downtime maintenance (ZDM) procedure.

FIG. 2 is a block diagram of example database layouts 202-208 used during maintenance and production phases 210 associated with a zero downtime maintenance (ZDM) procedure 212. For example, the layout 202 corresponds to a phase in which an original schema operates before the update. The layout 204 corresponds to a phase in which a shadow schema and a bridge schema are set up as preparation for beginning the update. The layout 206 corresponds to a phase in which the bridge schema is in use. The layout 208 corresponds to a phase in which the update is complete and everything has been moved over to the new version.

During the ZDM procedure 200, a new DB schema (e.g., bridge database schema 214) can be created in a database 218. Within the bridge database schema 214, a view 220 can be created for every table 222 in an original schema 216. Then the application servers can be configured to connect no longer to the original schema 216, but to the bridge database schema 214.

Afterwards, the original schema 216 can be altered by the update procedure, e.g., to match to the target release table structures and DB views, and content can be imported into the original schema 216.

Once the alterations to the original schema 216 are complete, the instances connected to the bridge database schema 214 can be stopped, the instances can be configured to connect to the original schema 216 again and can be started with the original schema 216, which now represents the target software, DB structure, and content.

FIG. 3 is a table 300 illustrating different availability levels 302 that apply to different types of system updates. For example, the levels 302 define zero downtimes 304 of zero for level A 302a and level B 302b. For each of the levels 302, the table 300 identifies re-login requirements 306. The table 300 also provides a description 308 and includes a visualization 310 that graphically illustrate periods of maintenance mode 312 and downtime 314.

In level D 302d, for example having a higher downtime relative to the other levels 302, an old instance is stopped, users are logged off, a new instance is started, and users can login again. The experienced downtime for a user is the duration of the shutdown plus the time needed to start the instances. In addition, the total duration can include the duration of the longest running user transaction on the start system, if the user sessions are not terminated.

In level C 302c, for example, the new instance is started in parallel to the old system, and users are logged off from the old system. There is one point in time in which no users are in the system. Users can login to the new instance, and the old instance is stopped. The experienced downtime is based on the longest running user transaction on the start instance, if the user sessions are not terminated.

In level B 302b, for example, the new instance is started in parallel to the old instance. Each user can log off from the old instance and login to the new instance individually. The experienced downtime is the duration for the re-login.

In level A 302a, for example, the user does not need to re-login. The user session is transferred automatically from the old instance and connected to the new instance. Some solutions prior to the use of techniques described herein can support level B 302b. With the techniques described herein, level A 302a can be achieved.

Implementations that are associated with level A 302a, for example, can replace implementations that use a rolling re-connect. For example, systems implementing a rolling re-connect need to be operated with at least two application servers. One application server is stopped, and users can continue to work with the other application server. Stopping the application server can include, for example, forcing users assigned to the application server to logout. Then, the application server is connected to the bridge database schema, the application server is restarted, and users can login to the newly started application server. The next application server is managed in the same manner. This is repeated until all application servers are connected to the bridge database schema.

In some implementations, the approach for ZDM is not to perform the re-connect for a complete application server instance, but instead for each work process of an application server instance individually. Once a bridge setup is complete, the transition can be triggered by the update tool. The application server instance can start the dynamic re-connect. If a work process runs a "commit work" for a user session, for example, the work process can be disconnected from the original schema and reconnected to the bridge database schema. Further, immediate reconnections of non-active work processes can occur. After the reconnects, users can continue to work. The reconnect can generally be seamless. For example, as the DB content which is read via the original schema and via the bridge database schema is 100% identical at that point in time, the application server instance does not need to invalidate buffers, read data from DB, and so on. Instead, operations can continue, buffers are still filled, and no degradation in performance is expected.

In some implementations, the following general features can be used for reconnecting application instances for an update. First, configurations for the database (re)connect can be changed. This enables the reconnect to be triggered when needed by the update tool. Once the reconnect has been triggered for the whole system, for example, a reconnect request can be forwarded to all server instances within the system. Within a server instance, the reconnect request can be sent to all work processes. Each work process can perform a DB reconnect as soon as possible. At each level, an actual reconnect state can be kept. In some implementations, a maximum time can be set for executing the reconnect.

In some implementations, the following functions for triggering the reconnect system-wide can be used. A start_reconnect function, for example, can trigger the reconnect for the whole system. Optionally, a maximum execution time can be set. A get_reconnect_state function, for example, can obtain the reconnect state for the whole system. In some implementations, the reconnect state of the whole system can have the following values. A value of NO_RECONNECT_TRIGGERED, for example, can be the state of the system if all servers have yet to start reconnecting. A value of RECONNECT_IN_PROGRESS, for example, can be the state of the system if there is at least one server with the state RECONNECT_IN_PROGRESS. A value of RECONNECT_COMPLETED, for example, can be the state of the system if the state of all servers with the same state RECONNECT_COMPLETED.

In some implementations, functions for triggering the reconnect within a server instance, e.g., for all work processes of the server instance, can include the following. A start_server_reconnect function, for example, can be used to trigger a reconnect of all work processes of a server instance. Optionally, a maximum execution time can be set. A get_server_reconnect_state function, for example, can be used to get the reconnect state of the server instance. In some implementations, the reconnect state of the server instance can have the following values. A value of NO_RECONNECT_TRIGGERED, for example, can be the state if no reconnect has been triggered for this server instance. A value of RECONNECT_IN_PROGRESS, for example, can be the state if there is at least one work process with state RECONNECT_IN_PROGRESS. A value of RECONNECT_COMPLETED, for example, can be the state if this is the state of all work processes of this server instance.

In some implementations, a detailed procedure for triggering the reconnect for a server instance can include the following. The server reconnect state can be checked and can return, for example, a value of reconnect_already_in_progress if the state is RECONNECT_IN_PROGRESS. Both the start time and maximum time for the reconnect can be saved. The server reconnect state can be set to RECONNECT_IN_PROGRESS. The reconnect state for each work process can be set to RECONNECT_IN_PROGRESS. Requests with ID REQ_HANDLER_RECONNECT_WP can be generated for each work process.

Triggering the reconnect inside a work process can occur in different ways. For example, forcing the reconnection inside a work process can be done by explicitly, such as by executing request REQ_HANDLER_RECONNECT_WP. In another example, forcing the reconnection inside a work process can be done implicitly, such as inside DB commit handling procedures.

The request handler for request REQ_HANDLER_RECONNECT_WP, for example, can first check the reconnect state of the work process. If the state is different from RECONNECT_IN_PROGRESS, for example, the process has already executed the reconnect implicitly, and the request handler can release the work process immediately. If the state is RECONNECT_IN_PROGRESS, for example, the request handler can call a DB interaction function such as db_reconnect. If the function returns SYSTEM_OK, for example, then the function ThDbReconnectCompleted can be called inside db_reconnect. ThDbReconnectCompleted can set the work process specific state to RECONNECT_COMPLETED and can check the server state. If the work process was the last work process to reconnect, then the server state can also change to RECONNECT_COMPLETED.

When executing a DB commit, for example, the DB interaction layer can ask the taskhandler whether a reconnect is needed. A function ThDbReconnectNeeded can be called, e.g., returning TRUE if the work process specific state is RECONNECT_IN_PROGRESS, and returning FALSE in all other cases. If all conditions are fulfilled, then db_reconnect can execute the reconnect. After completion, the function ThDbReconnectCompleted can be called to adjust the reconnect state.

In some implementations, a triggered reconnect may only work correctly if it uses the new configuration for the DB (re)connect. For example, as the event for parameter changes might not yet be processed, it is essential that db_reconnect looks up the new parameter values.

If a maximum runtime has been set for executing the reconnect, then any work processes which have not yet reconnected can be terminated. Therefore, a periodic check can be done, e.g., each minute. If the maximum time is exceeded, for example, cancel requests can be created to terminate the request execution of those work processes which did not reconnect in time. Such work processes can be restarted and can automatically connect to the new bridge DB schema, as the configurations for the database connect had been changed beforehand.

Monitoring transactions can be used to monitor reconnect states. A reconnect state can be determined, for example, using different types of monitoring transactions. As an example, a work process list of one server instance can be displayed, e.g., including active reconnects and the reconnect counter as part of the header. A new column, e.g., DB_Reconnect_state, can be used for each work process. If a work process needs to execute a reconnect, for example, then a line associated with the work process can be highlighted (e.g., displayed in yellow). In another example, a system-wide list of all server instances can be displayed, including displaying active reconnects in its header. A new column, e.g., DB_Reconnect_state, can be used for each server. If a server needs to execute a reconnect, for example, then a line associated with the server can be highlighted (e.g., displayed in yellow).

In some less common instances, server instances can start during a reconnect. If a server instance starts while the reconnect procedure is active, for example, operations can be taken to ensure that the new server instance reconnects to the correct DB schema. In some implementations, four points of time can be considered. A t_ProfRead time, for example, can identify a profile read time. A t_ProfChange time, for example, can identify a profile change time (e.g., performed by the update tool). A t_TriggerReconnect time, for example, can identify a reconnect start time. A t_ServerAttach time, for example, can identify a time of attachment to a message server (e.g., a time at which the server instance becomes visible inside the server instance list).

If t_ProfChange is before t_ProfRead, or if t_ServerAttach is before t_TriggerReconnect, for example, then everything is fine. A correct order and relationship among the points of time is: t_ProfRead<t_ProfChange<t_TriggerReconnect<t_ServerAttach.

When starting a server instance, a server startup procedure can be called. For example, inside the startup procedure, a method STARTUP CHECK can be run. The method can check its own reconnect state, and if the state is RECONNECT_IN_PROGRESS, then there is nothing further is to do. The method can also check whether there is at least one server instance which is in state RECONNECT_IN_PROGRESS, and if so, a reconnect can be triggered for this server instance.

Figure 4:
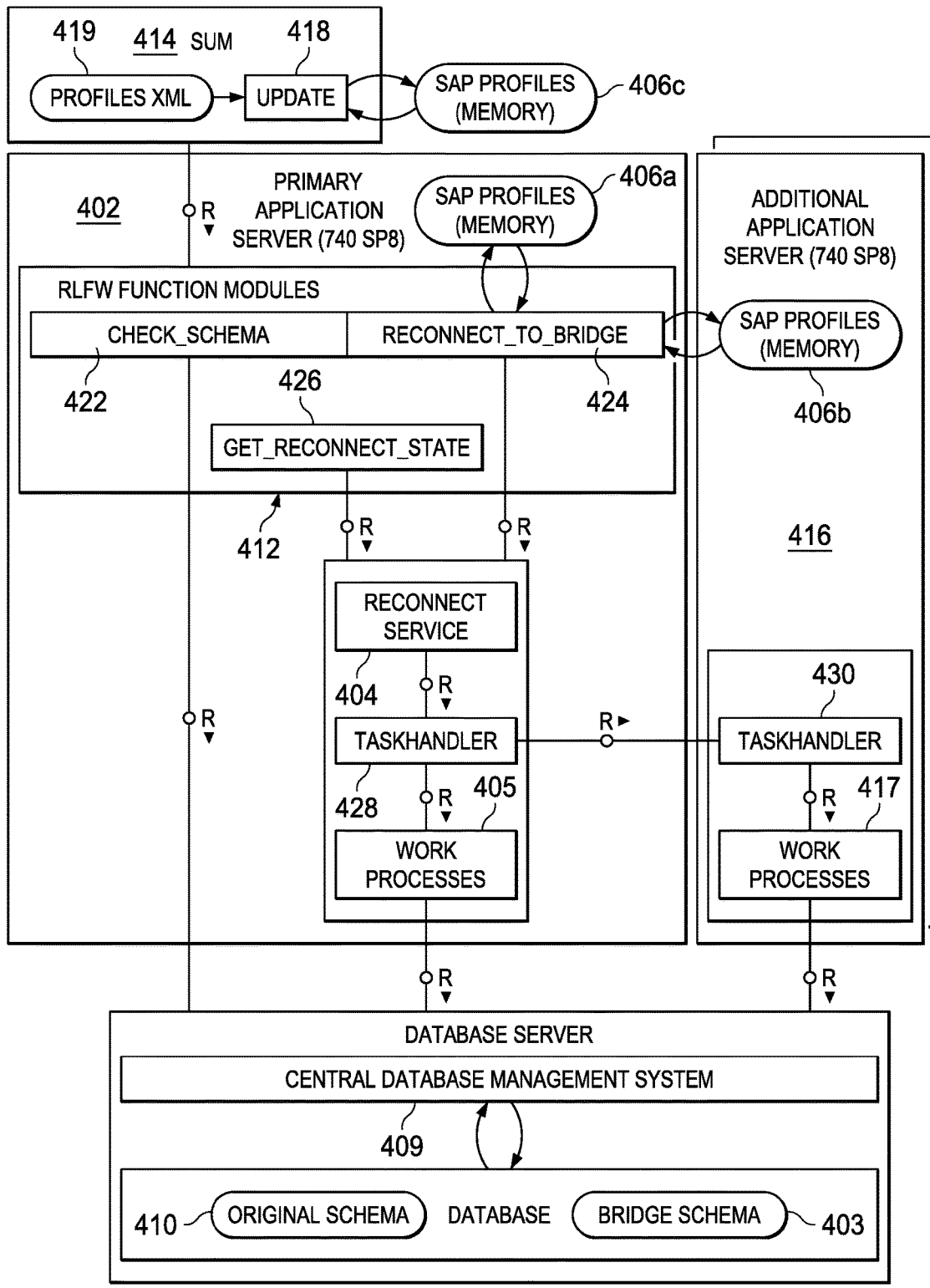
FIG. 4 is a block diagram illustrating an example architecture for components used in a ZDM update procedure.

FIG. 4 is a block diagram illustrating an example architecture for components used in a ZDM update procedure. Various procedures can be used during integration of an update. For example, on a source system (e.g., primary application server 402, using SAP's Netweaver 740 SP8 or higher), a reconnect service 404 of the primary application server 402 can be used to bring the productive users to the bridge system that uses a bridge database schema 403. The basic idea is to update the required bridge profile parameters 406a and then to notify the reconnect service 404 that all work processes 405 have to reconnect to the database 408, e.g., managed by a central database management system 409. Finally, the update procedure has to validate that all work processes for each instance are no longer connected to the original schema 410.

For accessing the reconnect service 404, the update tool can call the run level framework (RLFW) function modules 412, which are part of an initial tool import delivery by a software update manager (SUM) 414. Reconnect actions can be triggered, for example, by RLFW API functions within the server of the central instance. In this way, the SUM 414 can trigger a primary application server 402, which can then trigger the reconnects for additional application servers 416 and their associated work processes 417.

The SUM 414 can use profiles 419 associated with the SUM 414 for use in notifying the primary application server 402 about an update. Profiles 406c, for example, can provide business system-related profile information for use by the SUM 414. An update module 418 can serve to notify the primary application server 402 that an update is initiated and/or underway.

During the process an RLFW function module CHECK_SCHEMA 422 can be used for validating database connection information. A function module RLFW_RE-CONNECT_TO_BRIDGE 424 can be used to trigger reconnects to the bridge system. A get_reconnect_state function 426, for example, can be used to obtain the reconnect state for the whole system. Task handlers 428 and 430 can communicate with each other and can task individual work processes to reconnect.

A first operation of the update procedure can be to update profile parameters. For example, the update procedure first has to update the profile parameters on the file system (e.g., DEFAULT.PFL) and at the environment of the current work processes. Afterwards, all running work processes of each instance and even the work processes which are started or restarted later will receive the proper connection settings for the bridge system.

Beside the DB connection parameters, which are responsible for re-connecting to the bridge database schema, the parameters for system separation and smart switch handling need to be set accordingly. For example, as a prerequisite, all parameters need to become dynamic profile parameters.

A next operation of the procedure, for example, is to trigger reconnects to the bridge system. For example, to trigger reconnects to the bridge system, the update procedure can call a function module RLFW_RECONNECT_TO_BRIDGE. The function can, for example, set the given profile parameters dynamically on the system and then trigger a database reconnect for all work processes. Additionally, a parameter for maximum runtime information can be forwarded to the reconnect service 404. The maximum runtime parameter can have a default value, for example, of 300 seconds, and the value can be customized using a configuration file at the SUM 414, e.g., with a parameter /zdm/reconnect/timeout.

A next operation of the procedure, for example, can be to check reconnect states. As the reconnect procedure of the application server is ongoing, for example, the update tool can frequently query the reconnect state. While the reconnect service returns with a result of either success or error, the update tool will continue to call the function module RLFW_GET_RECONNECT_STATE.

A next operation of the procedure, for example, can be to validate database connections. For example, the update tool can call the RLFW function module CHECK_SCHEMA 422 for validating the database connection data. Each work process for all running system instances must be connected to the given bridge database schema. Otherwise the function module will return an error and the update tool will not continue.

Figure 5:
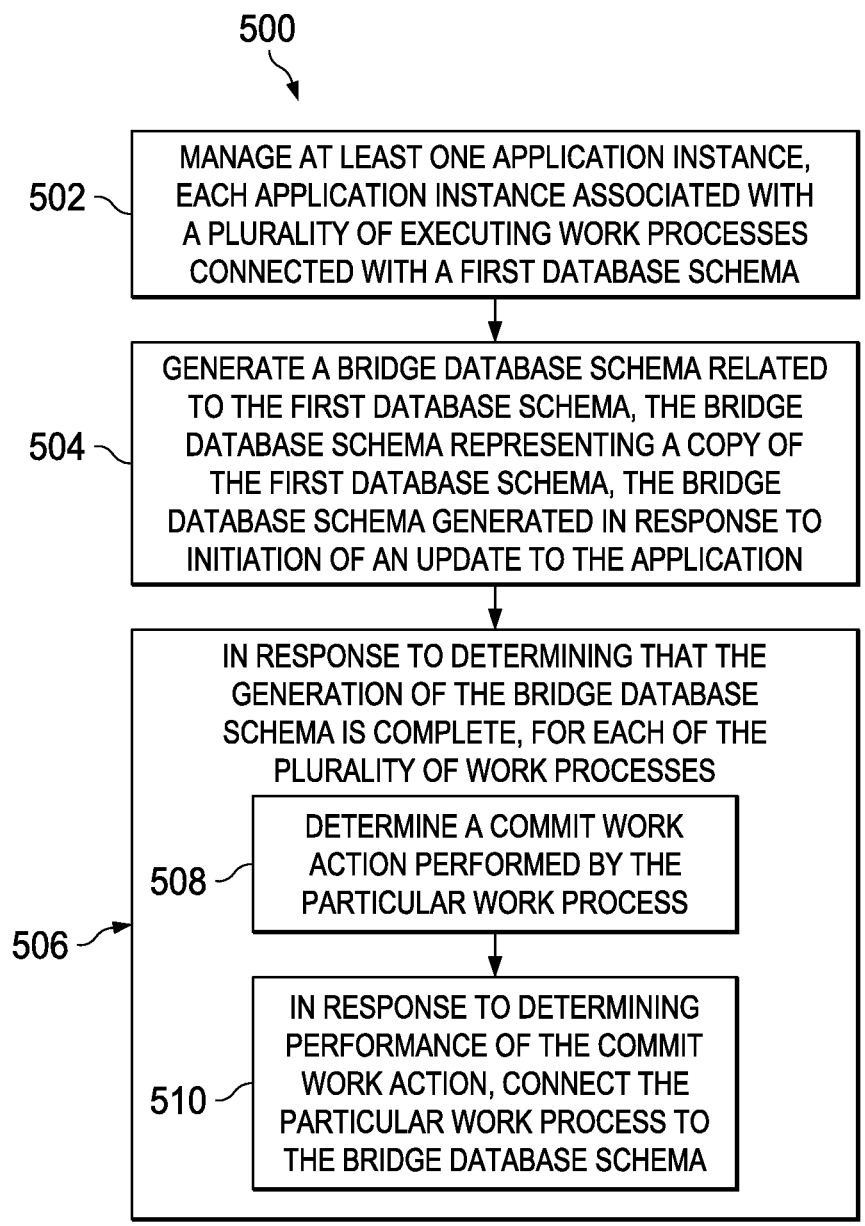
FIG. 5 is a flowchart of an example method for updating an application.

FIG. 5 is a flowchart of an example method 500 for updating an application. For clarity of presentation, the description that follows generally describes method 500 in the context of FIGS. 1-5.

At 502, at least one application instance of an application is managed. Each application instance is associated with a plurality of executing work processes connected with a first database schema. For example, the SUM 414 can manage application instances associated with the primary application server 402 and the additional application servers 416, as described above.

At 504, a bridge database schema is generated that is related to the first database schema. The bridge database schema can be, for example, the bridge database schema 214 or the bridge database schema 403, as described above. The bridge database schema represents a copy of the first database schema (e.g., the original schema 216 or the original schema 410). The bridge database schema is generated in response to initiation of an update to the application. For example, instructions to update a system can be received, such as by the SUM 414. The instructions can include a request to trigger a reconnection of the whole system to a bridge database schema (e.g., the bridge database schema 403). The instructions can also include, for example, parameters associated with the change. For example, a state function can be used to set the RECONNECT_IN_PROGRESS state for the whole system, which can begin process of cascading instructions to application servers.

At 506, in response to determining that the generation of the bridge database schema is complete, actions are taken to update the application for each of the plurality of work processes. For example, the process of cascading instructions can continue. In some implementations, a particular application server instance (e.g., primary application server 402) within the system can receive instructions indicating that application servers (e.g., including the additional application servers 416) and their associated work processes are to be connected to the bridge database schema. To achieve this, for example, the primary application server 402 can set the (Set RECONNECT_IN_PROGRESS state the additional application servers 416. Further, each application server can provide instructions that each work process of the particular application server instance is to be reconnected to the bridge database schema.

For non-executing work processes, reconnections occur based on parameters of the new schema. For executing work processes, the work process are monitored, and in response to a commit work operation of a particular work process, a reconnect to the bridge database schema is triggered.

At 508, a commit work action performed by the particular work process is determined. For example, one of the work processes 405 or 417 can perform a commit, e.g., data being stored or updated associated with the work process.

At 510, in response to determining performance of the commit work action, the particular work process is connected to the bridge database schema. For example, the work processes 405 or 417 can be connected to the bridge schema 403.

In some implementations, work processes still connected after a particular amount of time are forced to time out and reconnect to the bridge database schema. For example, a maximum runtime parameter with a default value (e.g., 300 seconds) can beset and stored in a configuration file used by the SUM 414.

In some implementations, the method 500 further includes determining that the update has completed, and in response to determining that the update has completed, the work processes of the application instance are reconnected to an updated database schema. For example, the task handlers 428 and 430 can reconnect work processes 405 and 417, respectively, to the updated database schema when the update has completed.

In some implementations, additional functionality can support the ability to switch users back to the old version of the application. For example, to achieve this, the application server can be stopped, database connection settings and profiles can be changed, and the application servers can be restarted. Afterwards, the user can use the old version again.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
    managing at least one application instance of an application, each application instance associated with a plurality of work processes connected with a first database schema;
    generating a bridge database schema related to the first database schema, the bridge database schema representing a copy of the first database schema, the bridge database schema generated in response to initiation of an update to the application; and
    in response to determining that the generation of the bridge database schema is complete, individually for each of the plurality of work processes:
        identifying, at the time the generation of the bridge database schema is complete, whether a particular work process is currently executing actions;
        in response to determining that the particular work process is currently executing actions at the time the generation of the bridge database schema is complete:
            determining a commit work action performed by the particular work process during its execution; and
            in response to determining performance of the commit work action, connecting the particular work process to the bridge database schema; and
        in response to determining that the particular work process is not executing actions at the time the generation of the bridge database schema is complete, connecting, the particular work process to the bridge database schema.

2. The method of claim 1, wherein in response to determining that the particular work process is currently executing actions at the time the generation of the bridge database schema is complete, the method further comprising:
    identifying a maximum runtime for executing the reconnect operation;
    in response to determining that a particular work process is still connected to the first database schema without a commit work action performed by the particular work process after the identified maximum runtime, automatically terminating the particular work process, restarting the particular work process, and automatically reconnecting the work process to the bridge database schema at restart.

3. The method of claim 1, wherein work processes associated with the application instance are connected to the bridge database schema during the application update.

4. The method of claim 1, further comprising:
determining that the update to the application has completed; and
in response to determining that the update has completed, reconnecting the work processes of the application instance to an updated database schema.

5. The method of claim 1, further comprising using state variables and function calls to perform the update.

6. The method of claim 5, wherein the state variables and function calls are associated with and applied to application instances and to work processes controlled by an application server controlling a given application instance.

7. The method of claim 1, wherein the update is performed using instructions provided to a task handler of a primary application server instance, which then communicates with task handlers of one or more other application server instances.

8. A system comprising:
memory storing:
a data store of information associated with an update; and
an update application for performing operations for the update, the operations including:
managing at least one application instance of an application, each application instance associated with a plurality of work processes connected with a first database schema;
generating a bridge database schema related to the first database schema, the bridge database schema representing a copy of the first database schema, the bridge database schema generated in response to initiation of an update to the application; and
in response to determining that the generation of the bridge database schema is complete, individually for each of the plurality of work processes:
identifying, at the time the generation of the bridge database schema is complete, whether a particular work process is currently executing actions;
in response to determining that the particular work process is currently executing actions at the time the generation of the bridge database schema s complete:
determining a commit work action performed by the particular work process; and
in response to determining performance of the commit work action, connecting the particular work process to the bridge database schema; and
in response to determining that the particular work process is not executing actions at the time the generation of the bridge database schema is complete, connecting the particular work process to the bridge database schema.

9. The system of claim 8, wherein in response to determining that the particular work process is currently executing actions at the time the generation of the bridge database schema is complete, the operations further comprising:
identifying a maximum runtime for executing the reconnect operation;
in response to determining that a particular work process is still connected to the first database schema without a commit work action performed by the particular work process after the identified maximum runtime, automatically terminating the particular work process, restarting the particular work process, and automatically reconnecting the work process to the bridge database schema at restart.

10. The system of claim 8, wherein work processes associated with the application instance are connected to the bridge database schema during the application update.

11. The system of claim 8, the operations further comprising:
determining that the application update has completed; and
in response to determining that the update has completed, reconnecting the work processes of the application instance to an updated database schema.

12. The system of claim 8, the operations further comprising using state variables and function calls to perform the update.

13. The system of claim 12, wherein the state variables and function calls are associated with and applied to application instances and to work processes controlled by an application server controlling a given application instance.

14. The system of claim 8, wherein the update is performed using instructions provided to a task handler of a primary application server instance, which then communicates with task handlers of one or more other application server instances.

15. A non-transitory computer-readable media encoded with a computer program, the program comprising instructions that when executed by one or more computers cause the one or more computers to perform operations comprising:
managing at east one application instance of an application, each application instance associated with a plurality of work processes connected with a first database schema;
generating a bridge database schema related to the first database schema, the bridge database schema representing a copy of the first database schema, the bridge database schema generated in response to initiation of an update to the application; and
in response to determining that the generation of the bridge database schema is complete, individually for each of the plurality of work processes:
identifying, at the time the generation of the bridge database schema is complete, whether a particular work process is currently executing actions;
in response to determining that the particular work process is currently executing actions at the time the generation of the bridge database schema is complete:
determining a commit work action performed by the particular work process; and
in response to determining performance of the commit work action, connecting the particular work process to the bridge database schema; and
in response to determining that the particular work process is not executing actions at the time the generation of the bridge database schema is complete, connecting, the particular work process to the bridge database schema.

16. The non-transitory computer-readable media of claim 15, wherein in response to determining that the particular work process is currently executing actions at the time the generation of the bridge database schema is complete, the operations further comprising:
identifying a maximum runtime for executing the reconnect operation;

in response to determining that a particular work process is still connected to the first database schema without a commit work action performed by the particular work process after the identified maximum runtime, automatically terminating the particular work process, restarting the particular work process, and automatically reconnecting the work process to the bridge database schema at restart.

17. The non-transitory computer-readable media of claim 15, wherein work processes associated with the application instance are connected to the bridge database schema during the application update.

18. The non-transitory computer-readable media of claim 15, the operations further comprising:
determining that the application update has completed; and
in response to determining that the update has completed, reconnecting the work processes of the application instance to an updated database schema.

19. The non-transitory computer-readable media of claim 15, the operations further comprising using state variables and function calls to perform the update.

20. The non-transitory computer-readable media of claim 19, wherein the state variables and function calls are associated with and applied to application instances and to work processes controlled by an application server controlling a given application instance.

* * * * *